(12) United States Patent
Blackburn

(10) Patent No.: US 7,789,414 B2
(45) Date of Patent: Sep. 7, 2010

(54) GAS GENERATOR ASSEMBLY MOUNTING MECHANISM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 540 days.

(21) Appl. No.: 11/414,118

(22) Filed: Apr. 28, 2006

(65) Prior Publication Data

US 2006/0244244 A1 Nov. 2, 2006

Related U.S. Application Data

(60) Provisional application No. 60/676,666, filed on Apr. 29, 2005.

(51) Int. Cl.
*B60R 21/217* (2006.01)
(52) U.S. Cl. .................................. 280/728.2; 24/16 PB
(58) Field of Classification Search .............. 280/728.1, 280/728.2, 730.2, 749; 24/16 PB, 16 R, 17 A, 24/17 AP, 30.5 P
See application file for complete search history.

(56) References Cited

U.S. PATENT DOCUMENTS

| | | | |
|---|---|---|---|
| 3,654,669 A * | 4/1972 | Fulton ...................... | 24/16 PB |
| 4,942,644 A | 7/1990 | Rowley ...................... | 24/16 PB |
| 5,159,728 A * | 11/1992 | Bingold ...................... | 24/16 PB |
| 5,398,383 A * | 3/1995 | Bingold ...................... | 24/16 PB |
| 5,802,888 A * | 9/1998 | Parsons ........................ | 70/16 |
| 5,966,781 A * | 10/1999 | Geiger ...................... | 24/16 PB |
| 6,082,761 A | 7/2000 | Kato et al. ............... | 280/730.2 |
| 6,196,033 B1 * | 3/2001 | Dowdle ........................ | 70/16 |
| 6,224,089 B1 * | 5/2001 | Uchiyama et al. ........ | 280/728.2 |
| 6,364,257 B1 * | 4/2002 | Holder ...................... | 248/74.3 |

OTHER PUBLICATIONS

Thomas & Betts Catalog.

* cited by examiner

*Primary Examiner*—Eric Culbreth
*Assistant Examiner*—Robert A Coker
(74) *Attorney, Agent, or Firm*—L.C. Begin & Associates, PLLC.

(57) ABSTRACT

A vehicle occupant protection system (180) includes an inflatable vehicle occupant restraint device (202) positioned in the vehicle, and a gas generating system (8) coupled to the inflatable restraint device (202) for providing inflation fluid to inflate the vehicle occupant restraint device. The gas generating system (8) is secured to the vehicle by a mounting mechanism (10) having a first strap (12) wrapped around a portion of the gas generating system (8) and a second strap (14) coupled to the first strap (12) and wrapped around a portion (24) of the vehicle.

6 Claims, 4 Drawing Sheets

GAS GENERATOR ASSEMBLY MOUNTING MECHANISM

CROSS REFERENCE TO RELATED APPLICATIONS

This application claims the benefit of provisional application Ser. No. 60/676,666 filed Apr. 29, 2005.

TECHNICAL FIELD

The present invention relates generally to gas generating systems and, more particularly, to a device for securing a gas generating system to a portion of a vehicle.

BACKGROUND OF THE INVENTION

Securing components of an automotive vehicle occupant protection system to a vehicle may be time-consuming and labor-intensive. The simplification and cost-reduction of the assembly procedures used to attach the protection system components to the vehicle are ongoing challenges.

SUMMARY OF THE INVENTION

In accordance with the present invention, a vehicle occupant protection system is provided including an inflatable vehicle occupant restraint device positioned in the vehicle, and a gas generating system coupled to the inflatable restraint device for providing inflation fluid to inflate the vehicle occupant restraint device. The gas generating system is secured to the vehicle by a mounting mechanism having a first strap wrapped around a portion of the gas generating system and a second strap coupled to the first strap and wrapped around a portion of the vehicle.

In another aspect of the invention, a mounting mechanism is provided for securing a gas generator to a vehicle. The mounting mechanism includes a first strap adapted to wrap in a first direction around a portion of the gas generator, and a second strap coupled to the first strap and adapted to wrap in the first direction around a portion of the vehicle. One or more locking mechanisms are provided for securing the first strap around the portion of the gas generator and for securing the second strap around the portion of the vehicle.

BRIEF DESCRIPTION OF THE DRAWINGS

FIG. 4A is a plan view of an alternative embodiment of a mounting mechanism in accordance with the present invention;

FIG. 4B is a side view of the mounting mechanism of FIG. 4A wrapped around a gas generator and a portion of a vehicle;

FIG. 5 is a schematic representation of an exemplary vehicle occupant protection system incorporating a gas generator assembly mounting mechanism in accordance with the present invention.

DETAILED DESCRIPTION

Figure 1:
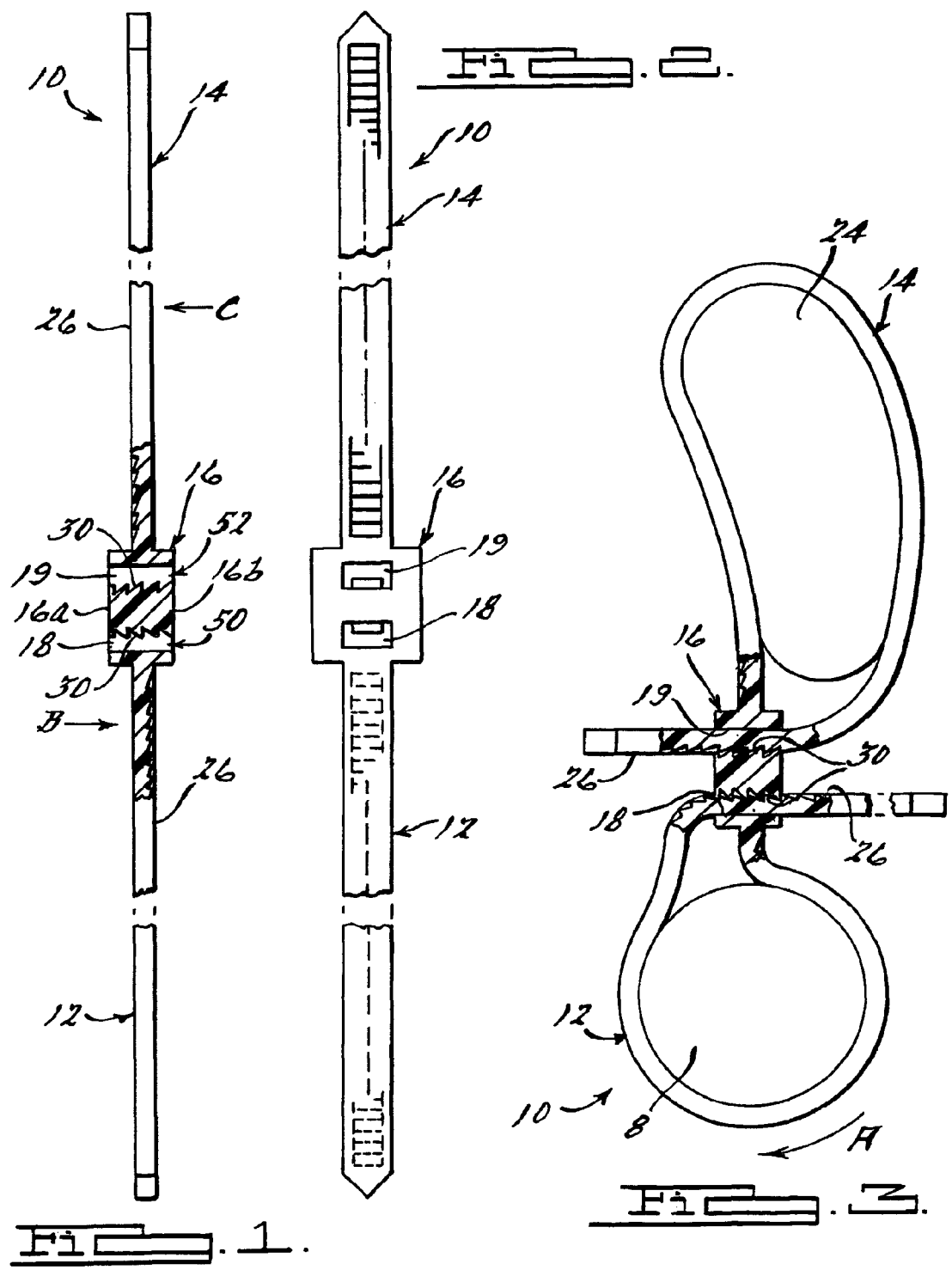
FIG. 1 is a cross-sectional side view of a gas generator assembly mounting mechanism in accordance with the present invention.
Figure 2:
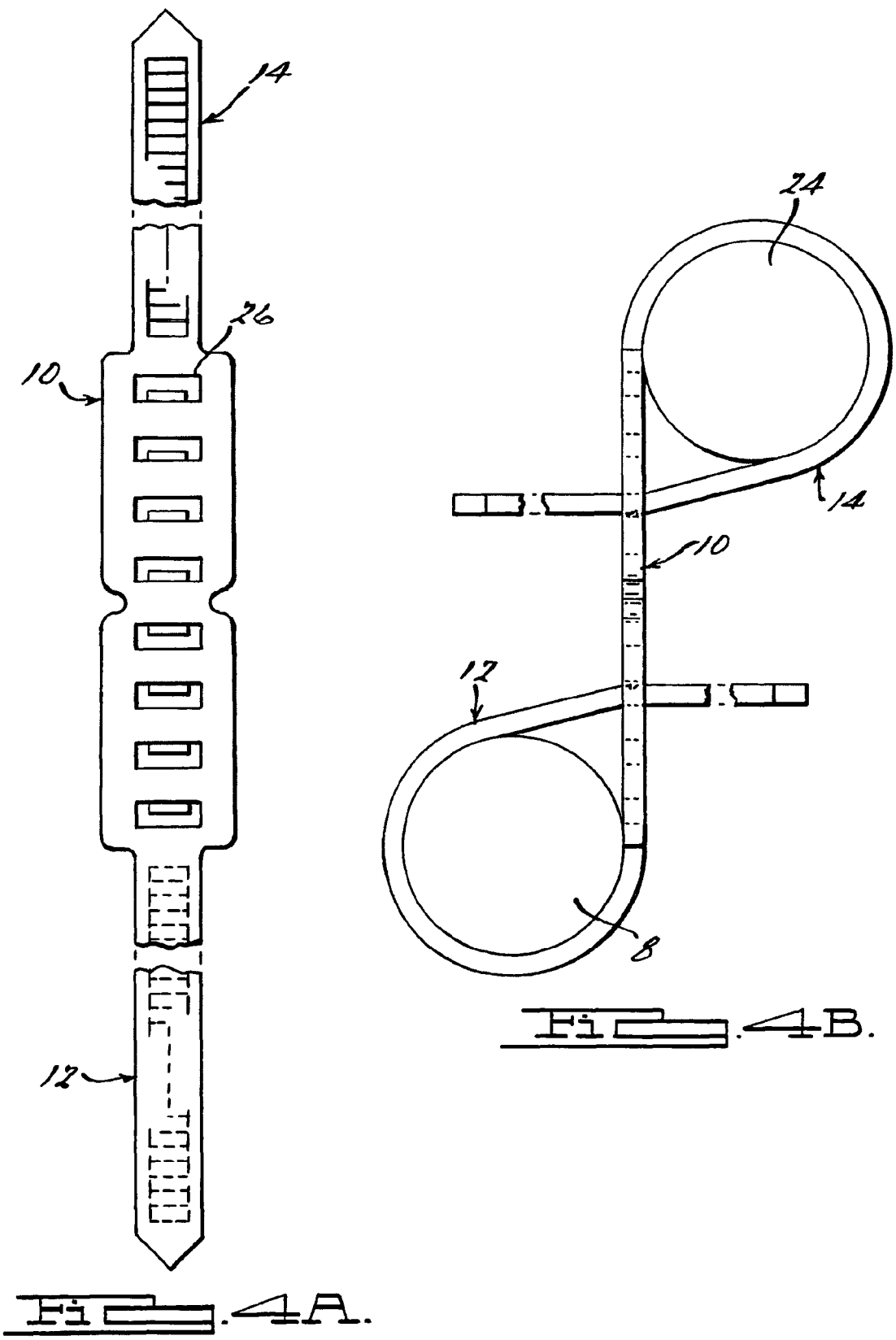
FIG. 2 is a top view of the gas generator assembly mounting mechanism of FIG. 1.
Figure 3:
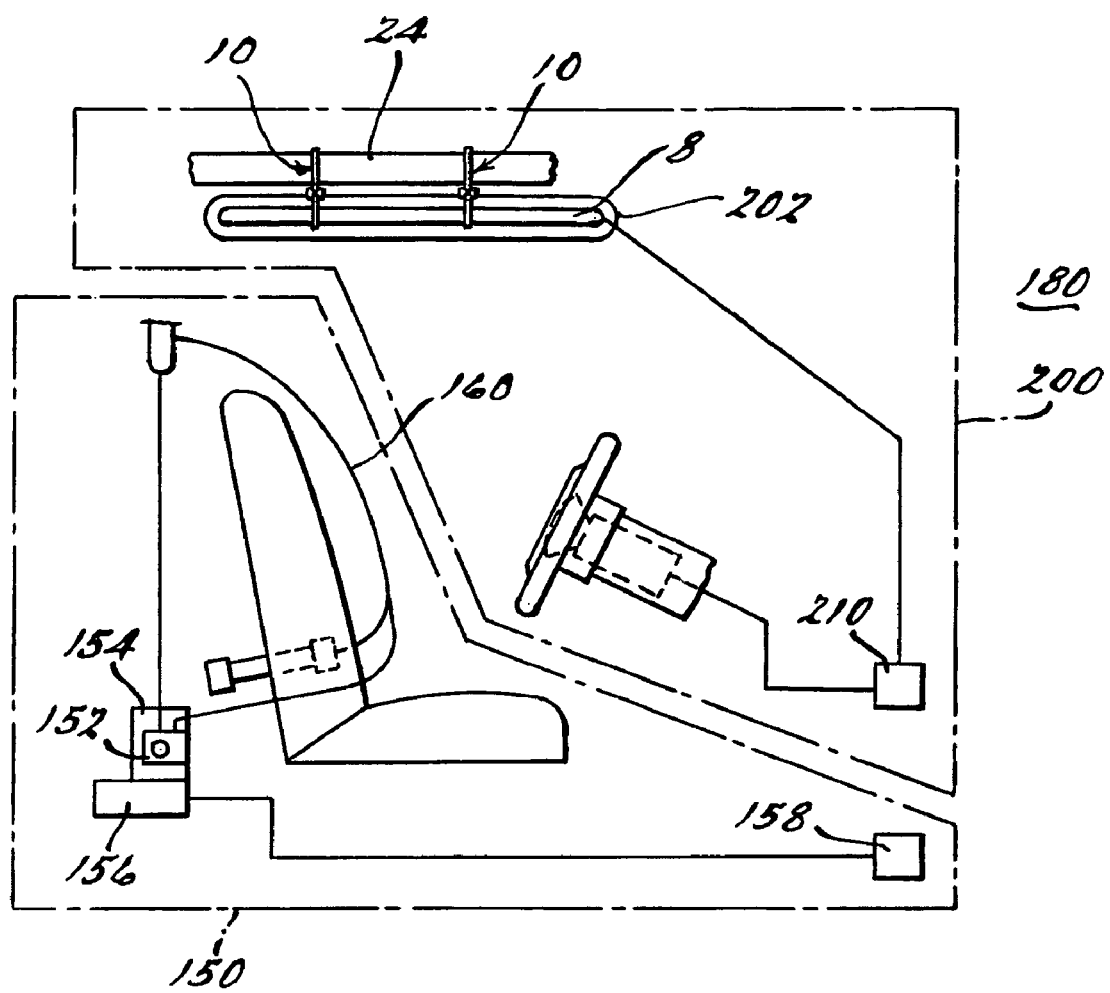
FIG. 3 is a side view of the gas generator assembly mounting mechanism of FIG. 1 showing engagement between the mounting mechanism, a gas generator assembly, and a structure to which the gas generator assembly is secured.

The present invention provides a gas generator assembly mounting mechanism for mounting a gas generator assembly to a structure (for example, a portion of a motor vehicle.) FIGS. 1-3 show a particular embodiment of a gas generator assembly mounting mechanism 10 in accordance with the present invention. Generally, the mounting mechanism 10 includes a first elongated, resilient strap 12 bendable to wrap in a first direction (denoted by arrow A in FIG. 3) around a portion 24 of the gas generator 8, and a second elongated, resilient strap 14 bendable to wrap in direction A around a portion of the vehicle (for example, a portion of a roof support attached to one of the vehicle pillars). A locking mechanism, generally designated 50, is provided for lockingly engaging a portion of first strap 12 to secure the first strap around the portion of the gas generator assembly 8. Similarly, a locking mechanism, generally designated 52, is provided for lockingly engaging a portion of second strap 14 to secure the second strap around the portion 24 of the vehicle.

The locking mechanisms 50, 52 may have any of a wide variety of structures. However, the particular design or features of the locking mechanisms are not crucial to the present invention, as long as the locking mechanisms may be incorporated into a portion of the mounting mechanism, and as long as the locking mechanisms enable the straps to be wrapped around and secured around gas generators and portions of the vehicle having a range of diameters or sizes. The locking mechanisms 50, 52 hold respective ends of straps 12 and 14 in place once the straps have been wrapped around and snugged against gas generator assembly 8 and the vehicle structure 24.

Referring again to FIGS. 1-3, in one example, the mounting mechanism includes a base portion 16 which incorporates locking mechanisms 50 and 52 therein. By way of example and not limitation, elements of the locking mechanism may be provided in base portion 16 so as to engage straps 12 and 14 to maintain the straps in a desired configuration once the straps have been wrapped around both gas generator 8 and the vehicle portion 24 to which the gas generator is to be secured. A first opening 18 is formed in base portion 16 in communication with locking mechanism 50 for lockingly receiving and securing a portion of first strap 12 therein from a first direction (indicated by arrow B). Similarly, a second opening 19 is formed in base portion 16 in communication with locking mechanism 52 for lockingly receiving and securing a portion of second strap 14 therein from a second direction (indicated by arrow C) different from the first direction. In this embodiment, the locking mechanism comprises a series of grooves 26 formed along respective sides of each of straps 12 and 14, and a series of ridges 30 formed within base portion 16 which are designed to engage corresponding ones of the strap grooves when ends of straps 12 and 14 are inserted into respective openings 18 and 19, to retain the ends of the straps within the base portion. The series of grooves 26 allows mounting member 10 to secure gas generator assemblies of various sizes and diameters to portions of the vehicle having various sizes and diameters. Specifically, grooves 26 and ridges 30 are sized and configured to cooperate so as to selectively, mechanically lock ends of straps 12 and 14 in place in strap-receiving orifice 18 of locking member 16, thereby attaching gas generator assembly 8 to structure 24.

In the embodiment shown in FIG. 3, straps 12 and 14 are configured to wrap in the same direction "A", or clockwise, around the gas generator assembly and the portion of the vehicle, respectively. Also, looking into the page of the drawing in FIG. 3, an inside of the vehicle is taken to be to the right of mounting mechanism 10, while an exterior of the vehicle is taken to be to the left of the mounting mechanism. In this arrangement, the common wrap direction "A" of both straps provides certain advantages. To begin with, gas generator 8 may be secured within mounting mechanism 10 and an airbag mounted to the gas generator to form an airbag module for attachment to the vehicle, while strap 14 may be looped around the portion of the vehicle and pulled taught through base portion 16 from the exterior of the vehicle, thereby making attachment to the vehicle easier. Also, in the arrangement shown, it is believed that mounting mechanism 10 will permit some degree of rotation or pivoting of the gas generator in direction "A" with respect to vehicle portion 24. This rotation also permits some tolerance or a degree of flexibility with regard to the direction in which gas exit apertures (not shown) of the gas generator are positioned during securement of the gas generator within mounting mechanism 10. In one embodiment, for enhanced deployment of the associated airbag, it is desirable that the gas exit apertures be initially positioned to direct gases toward the center of the vehicle, thereby providing initial horizontal thrust through the associated vehicle trim, for example. Upon activation, the gas generator mounted as shown in FIG. 3 may pivot slightly in direction "A", thereby providing a downward direction of gas and enhancing the vertical deployment of the bag after an initial horizontal movement. Thus, upon actuation, the moment acting on the gas generator enables the gas discharge direction through the gas discharge apertures to be "self-adjusting" to a certain degree, thereby enhancing the reliability and repeatability of airbag deployment.

In another example, base portion 16 may include one or more deflectable pawls or other features (not shown) designed to grip or press into a surface of each of straps 12, 14 when the straps are inserted into respective orifices 18, 19 of base portion 16, to retain the ends of the straps in a desired position within the base portion.

Referring again to FIGS. 1-3, it may be seen that first strap 12 is secured when a portion of the first strap is inserted into base portion 16 along a first surface 16a of the base portion. It may also be seen that second strap 14 is secured when a portion of the second strap is inserted into base portion 16 along a second surface 16b of the base portion different from first surface 16a.

Figure 6:
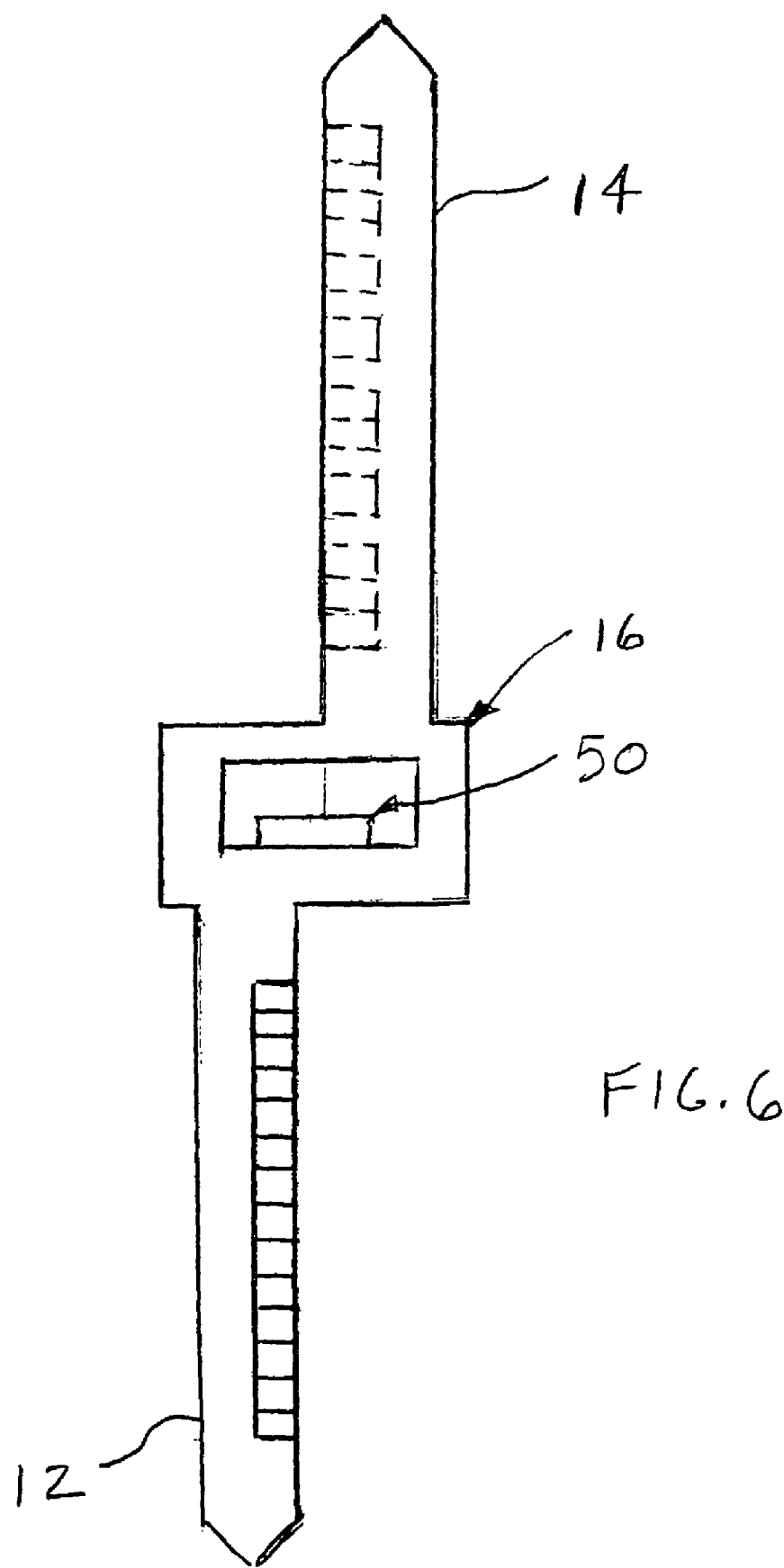
FIG. 6 is a top view of a gas generator assembly mounting mechanism in accordance with another alternative embodiment of the present invention.

Referring to FIG. 6, in an alternative embodiment of the mounting mechanism, locking mechanism 50 for securing first strap 12 also secures the second strap 14.

The locking mechanism may alternatively be incorporated into one or more of straps 12 and 14. For example, in the embodiment, shown in FIGS. 4A and 4B, each of straps 12, 14 has a corresponding plurality of openings 26 formed along a portion thereof. Openings 26 incorporate features (not shown) designed to lockingly engage complementary features (not shown) on respective ones of straps 12 and 14 inserted therein when the straps have been wrapped around the gas generator and the portion of the vehicle. In this embodiment, greater flexibility is attained in the positioning of gas generator 8 with respect to vehicle portion 24 by providing a plurality of openings spaced along the length of the mounting mechanism. For example, as the entire structure of mechanism 10 is relatively flexible, a gas generator 8 having a relatively smaller diameter may be positioned either farther from or closer to vehicle portion 24 by appropriate selection of the opening 26 in which the end portion of strap 12 is inserted, by feeding strap 12 through the opening a distance such that the strap is snugged against the gas generator within the loop formed by strap 12, and by securing the strap in the desired position using the associated locking mechanism.

In the embodiment shown in FIGS. 1-3, first strap 12 and second strap 14 extend from opposite sides of base portion 16. However, in an embodiment incorporating a base portion 16, strap 14 may extend from the base portion in any desired orientation with respect to strap 12, according to the needs of a particular application. In addition, more than two straps may extend from base portion 16 as required. Also, straps 12 and 14 may not extend directly from base portion 16, but rather may extend from one or more portions of mounting mechanism 10 which are coupled to or contiguous with base portion 16. Various other embodiments of locking mechanism 20 are able to perform the function set forth.

In other embodiments (not shown), and depending on design and airbag deployment criteria, straps 12 and 14 may wrap in different directions with respect to base portion 16.

In the embodiment shown in FIGS. 1-3, gas generator assembly 8 is generally cylindrical in shape. However, the mounting mechanism described herein may be utilized to mount a gas generator assembly having any one of a variety of shapes provided the gas generator assembly has a feature by which it may be suspended or mounted, and about which resilient members 12 may be wrapped, to secure together gas generator 8 and mounting mechanism 10.

It may be seen from the above description that attachment of the gas generating system using a mounting mechanism as described herein greatly reduces the time and expense required to attach the gas generating system, or the airbag module in general, to the vehicle. It also enables the mounting mechanism to be positioned on the gas generating system at a different time and/or at a different location than that at which the gas generator is attached to the vehicle, thereby providing increased manufacturing flexibility and enabling a further reduction in assembly costs.

FIG. 5 shows a gas generator assembly 8 mounted to a roof pillar of a motor vehicle using an embodiment of the mounting mechanism of the present invention. As seen in FIG. 5, in addition to securing gas generator assembly 8 to structure 24, mounting mechanism 10 may be used to secure other elements (for example, an airbag 202 of an airbag system 200 or a broader vehicle occupant protection system) to structure 24. Airbag system 200 includes at least one airbag 202 and a gas generator assembly 8 coupled to airbag 202 so as to enable fluid communication with an interior of the airbag. Airbag system 200 may also be in communication with a crash event sensor 210 which communicates with a known crash sensor algorithm that signals actuation of airbag system 200 via, for example, activation of gas generator assembly 8 in the event of a collision.

Referring again to FIG. 5, a gas generating system secured to the vehicle as described herein or an airbag system including a gas generating system secured as described herein may be incorporated into a broader, more comprehensive vehicle occupant protection system 180 including additional elements such as a safety belt assembly 150. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a crash event sensor 158 (for example, an inertia sensor or an accelerometer) that is in operative communication with a crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200 and, more broadly, vehicle occupant protection system 180 exemplify but do not limit gas generating systems contemplated in accordance with the present invention.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A mounting mechanism for securing a gas generator to a vehicle, the mounting mechanism comprising:
   a first strap adapted to wrap around a portion of the gas generator;
   a second strap coupled to the first strap and adapted to wrap around a portion of the vehicle;
   a locking mechanism for securing the first strap around the portion of the gas generator; and
   a locking mechanism for securing the second strap around the portion of the vehicle,
   wherein at least one of the first strap and the second strap includes a plurality of openings formed therealong adapted for receiving a portion of the at least one of the first strap and the second strap therein, and wherein the locking mechanism comprises a locking feature incorporated into at least one opening of the plurality of openings, each locking feature being adapted for lockingly engaging the portion of the at least one of the first strap and the second strap.

2. A vehicle occupant protection system including a gas generator and a mounting mechanism in accordance with claim 1 for securing the gas generator to a vehicle.

3. An airbag module comprising:
   a gas generating system;
   a mounting mechanism in accordance with claim 1 for securing the gas generating system to a vehicle and
   an airbag operatively coupled to the gas generating system.

4. A method for securing a gas generator to a vehicle comprising the steps of:
   providing a first strap adapted to wrap around a portion of the gas generator;
   providing a second strap coupled to the first strap and adapted to wrap around a portion of the vehicle;
   wrapping the first strap around the portion of the gas generator so as to form a snug fit between the first strap and the portion of the gas generator;
   securing the first strap around the portion of the gas generator so as to substantially maintain the snug fit between the first strap and the portion of the gas generator;
   wrapping the second strap around the portion of the vehicle so as to form a snug fit between the second strap and the portion of the vehicle; and
   securing the second strap around the portion of the vehicle so as to substantially maintain the snug fit between the second strap and the portion of the vehicle,
   wherein at least one of the first strap and the second strap includes a plurality of openings formed therealong adapted for receiving a portion of the at least one of the first strap and the second strap therein,
   and wherein a locking mechanism is incorporated into the at least one of the first strap and the second strap, the locking mechanism including a locking feature incorporated into at least one opening of the plurality of openings, each locking feature being adapted for lockingly engaging the portion of the at least one of the first strap and the second strap.

5. An airbag module including a gas generator secured to a vehicle in accordance with the method of claim 4.

6. A vehicle occupant protection system including a gas generator secured to a vehicle in accordance with the method of claim 4.

* * * * *